(12) United States Patent
Reiss et al.

(10) Patent No.: US 11,333,164 B2
(45) Date of Patent: May 17, 2022

(54) AIRPLANE TURBOJET FAN BLADE OF CAMBERED PROFILE IN ITS ROOT SECTIONS

(71) Applicant: SAFRAN AIRCRAFT ENGINES, Paris (FR)

(72) Inventors: Hanna Reiss, Pontault-Combault (FR); Adrien Biscay, Paris (FR); Benoit Fayard, Chatillon (FR); Laurent Jablonski, Melun (FR); Damien Merlot, Vaux le Penil (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 828 days.

(21) Appl. No.: 14/403,003

(22) PCT Filed: May 23, 2013

(86) PCT No.: PCT/FR2013/051125
§ 371 (c)(1),
(2) Date: Nov. 21, 2014

(87) PCT Pub. No.: WO2013/178914
PCT Pub. Date: Dec. 5, 2013

(65) Prior Publication Data
US 2015/0152880 A1    Jun. 4, 2015

(30) Foreign Application Priority Data
May 31, 2012    (FR) ...................................... 1255020

(51) Int. Cl.
*F04D 29/38*    (2006.01)
*F04D 29/32*    (2006.01)
(Continued)

(52) U.S. Cl.
CPC ........... *F04D 29/384* (2013.01); *F01D 5/141* (2013.01); *F04D 19/002* (2013.01);
(Continued)

(58) Field of Classification Search
CPC .... F04D 29/384; F04D 29/388; F04D 29/324; F04D 29/666; F04D 19/002;
(Continued)

(56) References Cited

U.S. PATENT DOCUMENTS 5,088,894 A * 2/1992 Patel ...................... F01D 5/141
                                                 416/219 R
5,131,815 A * 7/1992 Yamaguchi ............. F01D 5/141
                                                 416/223 A
(Continued)

FOREIGN PATENT DOCUMENTS

EP        1452741 A1    9/2004
EP        1927724 A2    6/2008
(Continued)

OTHER PUBLICATIONS

International Search Report dated Sep. 12, 2013 in PCT/FR2013/051125 filed May 23, 2013.
(Continued)

*Primary Examiner* — David E Sosnowski
*Assistant Examiner* — Wayne A Lambert
(74) *Attorney, Agent, or Firm* — Oblon, McClelland, Maier & Neustadt, L.L.P.

(57) ABSTRACT

A fan blade for an airplane turbojet, the blade including an airfoil extending axially between a leading edge and a trailing edge and including a plurality of airfoil sections stacked radially between a root section and a tip section. All of the airfoil sections situated between the root section and an airfoil section situated at a radial height corresponding to
(Continued)

30% of a total radial height of the airfoil possess a skeleton curve having a point of inflection.

10 Claims, 2 Drawing Sheets

(51) Int. Cl.
    *F04D 29/66*           (2006.01)
    *F01D 5/14*            (2006.01)
    *F04D 19/00*           (2006.01)

(52) U.S. Cl.
    CPC ......... *F04D 29/324* (2013.01); *F04D 29/388* (2013.01); *F04D 29/666* (2013.01); *F05D 2220/36* (2013.01); *F05D 2250/713* (2013.01); *F05D 2260/961* (2013.01); *Y02T 50/60* (2013.01)

(58) Field of Classification Search
    CPC ......... F05D 2250/713; F05D 2260/961; F05D 2220/36; F05D 2240/301; Y02T 50/673; Y02T 50/671
    USPC ...................................... 416/241 R
    See application file for complete search history.

(56) References Cited

U.S. PATENT DOCUMENTS

| | | | | |
|---|---|---|---|---|
| 5,642,985 A * | 7/1997 | Spear | ............... | F01D 5/141 415/181 |
| 6,071,077 A * | 6/2000 | Rowlands | ............... | F01D 5/141 416/223 A |
| 7,204,676 B2 * | 4/2007 | Dutton | ............... | F01D 5/141 416/238 |
| 7,419,353 B2 * | 9/2008 | Guemmer | ............... | F01D 5/141 415/191 |
| 8,152,473 B2 * | 4/2012 | Clemen | ............... | F01D 5/141 416/241 R |
| 2004/0170502 A1 | 9/2004 | Talbotec et al. | | |
| 2004/0227035 A1 | 11/2004 | Hubbard | | |
| 2007/0158495 A1 | 7/2007 | Hubbard | | |
| 2007/0243068 A1 | 10/2007 | Wadia et al. | | |
| 2009/0226322 A1 | 9/2009 | Clemen | | |
| 2010/0068064 A1 * | 3/2010 | Nagai | ............... | F01D 5/141 416/223 A |
| 2010/0284801 A1 * | 11/2010 | Greim | ............... | F01D 5/141 415/182.1 |
| 2010/0296924 A1 * | 11/2010 | Boning | ............... | F01D 5/141 415/208.1 |
| 2011/0206527 A1 * | 8/2011 | Harvey | ............... | F04D 29/324 416/223 R |
| 2012/0230834 A1 | 9/2012 | Cornelius et al. | | |
| 2013/0028749 A1 * | 1/2013 | Elorza Gomez | ........ | F01D 5/141 416/243 |
| 2016/0195094 A1 * | 7/2016 | Yamashita | ............... | F04D 29/30 416/204 R |

FOREIGN PATENT DOCUMENTS

| | | |
|---|---|---|
| EP | 2299124 A1 | 3/2011 |
| FR | 2889861 A1 | 2/2007 |
| GB | 2106192 A | 4/1983 |

OTHER PUBLICATIONS

K.V. Kholschevnikov, "Theory and Calculation of Aircraft Impeller Machines", Machinostroyenie, 1970, pp. 221-223, with English translation.

A.A. Inozemtsev, et al., "Gas-Turbine Engines", Aviadvigatel, 2006, pp. 255-257, with English translation.

* cited by examiner

AIRPLANE TURBOJET FAN BLADE OF CAMBERED PROFILE IN ITS ROOT SECTIONS

BACKGROUND OF THE INVENTION

The present invention relates to the general field of fan blades for airplane turbojets, and it relates more particularly to the profile of root sections in such blades.

The developments being made to airplane turbojets seek mainly to improve performance and to reduce weight. More precisely, in the context of small-diameter turbojets, it is known that weight savings can be obtained in their fans by reducing the number of blades in a fan, by increasing the relative pitch at the blade tips, and by reducing the hub ratio of the fan.

In particular, a small hub ratio makes it possible to increase the specific flow rate of the engine (for a given fan diameter), and thus to increase its thrust without penalizing its weight. Nevertheless, reducing the hub ratio leads to reducing the frequency of the first resonant mode in bending of the blades of the fan (written 1F mode). Unfortunately, the 1F mode coinciding with the first harmonic of the engine leads to unstable vibratory behavior of the blades that can cause them to crack.

In order to solve that problem of the reduction in the 1F mode of the blades, it is possible either to increase their chord (i.e. the length of the segment of the line going from the leading edge to the trailing edge of such a blade), or else to increase their root section.

Nevertheless, neither of those solutions is found to be satisfactory. Increasing the chord of the blade leads in particular to an increase in the length and thus the weight of the turbojet. Likewise, thickening the root sections of the blades leads to a significant increase in the weight of the fan, and thus to the weight of the turbojet. That solution also presents the drawbacks of penalizing the performance of the turbojet and of running the risk of blocking at the fan root.

OBJECT AND SUMMARY OF THE INVENTION

There thus exists a need to be able to have available a fan blade shape that makes it possible to reduce its first bending mode without that increasing the weight or the length of the turbojet.

This object is achieved by a fan blade for an airplane turbojet, the blade comprising an airfoil extending axially between a leading edge and a trailing edge and having a plurality of airfoil sections stacked radially between a root section and a tip section, wherein, in accordance with the invention, all of the airfoil sections situated between the root section and an airfoil section situated at a radial height corresponding to 30% of the total radial height of the airfoil possess a skeleton curve having a point of inflection.

The skeleton curve of an airfoil section is constituted by variations in the skeleton angle as a function of position along the chord of the blade. More precisely, the term "skeleton angle" is used to mean the angle formed between the tangent at each point of the blade skeleton with the axis of the engine.

Surprisingly, the inventors have observed that the presence of a point of inflection in the skeleton curves for all of the airfoil sections lying in the range 0% to 30% of the total radial height of the airfoil makes it possible to increase the 1F mode of the blade without degrading the aerodynamic performance of the blade. Furthermore, this stiffening of the blade airfoil takes place without increasing the chord of the blade and without increasing the thickness of its root section.

Preferably, the points of inflection of the skeleton curves of airfoil sections lying between the root section and an airfoil section situated at a radial height corresponding to 30% of the total radial height of the airfoil are situated in the range 25% to 75% of the chord length of the blade as measured from the leading edge going towards the trailing edge.

Also preferably, these points are situated in the range 40% to 50% of the chord length of the blade as measured from the leading edge going towards the trailing edge.

Also preferably, the slope of the tangent at the point of inflection of the skeleton curve decreases continuously between the root section and the airfoil section situated at a radial height corresponding to 30% of the total radial height of the airfoil.

The invention also provides an airplane turbojet fan having a plurality of blades as defined above. The invention also provides an airplane turbojet having such a fan.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
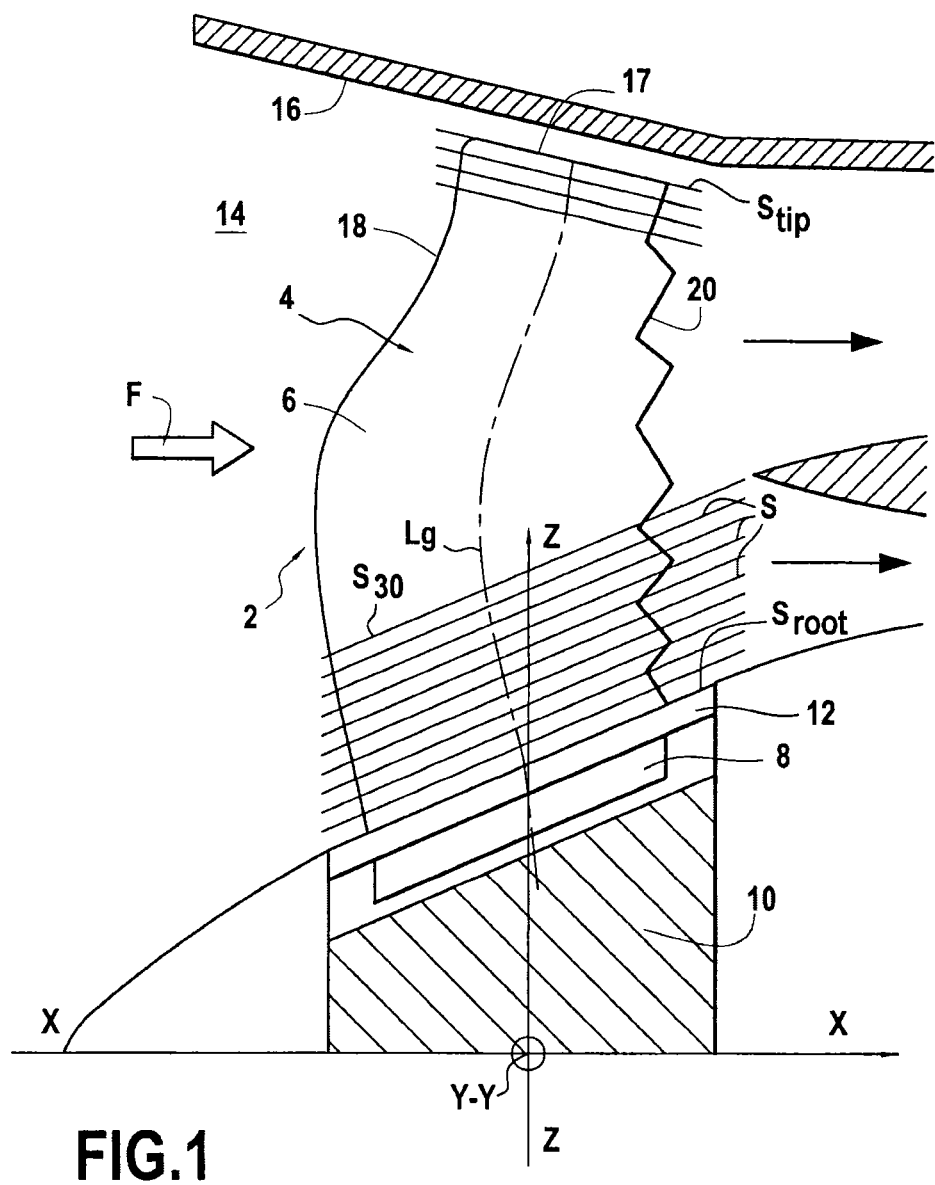
FIG. 1 is a fragmentary view in longitudinal section of a turbojet fan having blades of the invention.

The invention applies to any airplane turbojet fan, and in particular to turbojet fans of small diameter, such as that shown in FIG. 1.

FIG. 1 shows a turbojet fan 2 having a plurality of blades 4 in accordance with the invention that are regularly spaced apart from one another around the longitudinal axis X-X of the turbojet, this axis X-X extending in the flow direction F of the flow of air passing through the fan.

The blades 4 of the fan are preferably made of metal alloy. Each blade 4 comprises an airfoil 6 and a root 8 mounted on a disk (or hub) 10 that is driven in rotation about the longitudinal axis X-X of the turbojet. Each blade may also have a platform 12 forming a portion of the inside wall defining the inside of the flow passage 14 for the air stream F passing through the fan. A wall 16 of a casing surrounding the fan forms the outer wall that defines the outside of that flow passage.

In the description below, for each blade 4, a radial axis Z-Z is defined as being perpendicular to the longitudinal axis X-X and passing through the center of gravity of the section that occurs at the intersection between the blade and the inside wall of the flow passage for the cold air stream. A tangential axis Y-Y forms a right-handed rectangular reference frame in association with the axes X-X and Z-Z.

As shown in FIG. 1, the airfoil 6 of the blade 4 has a plurality of airfoil sections S with centers of gravity that are stacked along a line $L_g$ of centers of gravity.

The airfoil sections S are situated at increasing radial distances from the longitudinal axis X-X and they are defined along the radial axis Z-Z between a root section $S_{root}$ and a tip section $S_{tip}$ at the tip 17 of the blade. The root section $S_{root}$ is situated at 0% of the total radial height of the blade measured from the blade root towards its tip. Likewise, the tip section $S_{tip}$ is situated at 100% of the total radial height of the blade measured from the root of the blade going towards its tip.

Figure 2:
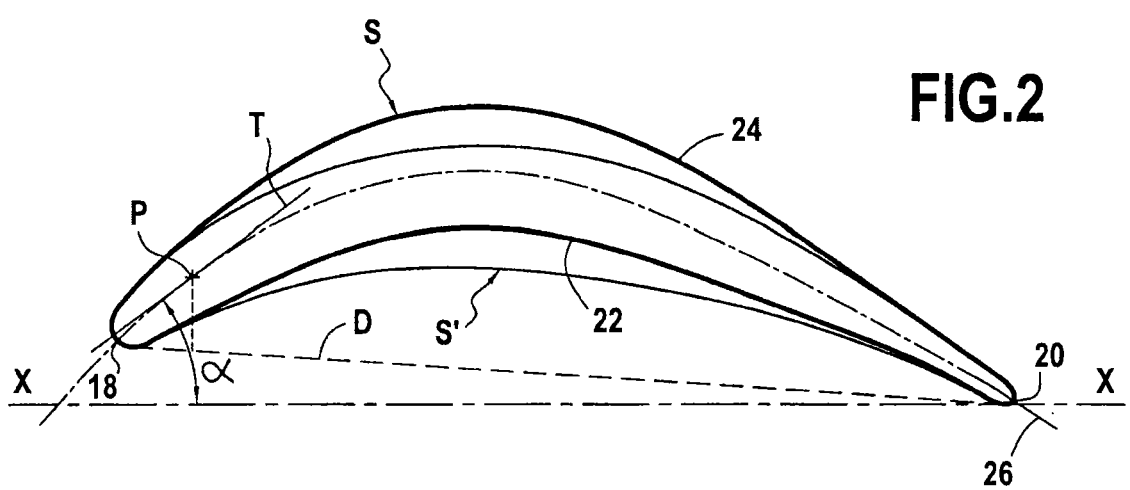
FIG. 2 is a view of an airfoil section of a blade in accordance with the invention.

The resulting stack forms an aerodynamic surface that extends along the longitudinal axis X-X between a leading edge 18 and a trailing edge 20 and along the tangential direction Y-Y between a pressure side face 22 and a suction side face 24 (FIG. 2).

In accordance with the invention, provision is made to give a cambered profile to all of the airfoil sections situated between the root section $S_{root}$ and the airfoil section $S_{30}$ situated at 30% of the total radial height of the airfoil as measured from the blade root going towards its tip.

FIG. 2 shows an airfoil section profile S that is cambered in accordance with the invention relative to an airfoil section profile S' of the prior art (i.e. that is not cambered).

The accentuated camber of an airfoil section is defined by the presence of a point of inflection I on the skeleton curve for the airfoil section in question (this is also referred to as an "S-shaped" skeleton curve). In the invention, all of the airfoil sections situated between the root section $S_{root}$ and the airfoil section $S_{30}$ present skeleton curves that have a point of inflection.

The term "skeleton curve of an airfoil section" is used herein to mean the variations for a given airfoil section in the skeleton angle $\alpha$ as a function of position along the chord D of the blade (i.e. along the straight line segment connecting the leading edge 18 to the trailing edge 20 of the corresponding blade section).

As shown in FIG. 2, the skeleton angle $\alpha$ is formed between the tangent T at each point P of the skeleton 26 of the blade and the longitudinal axis X-X of the turbojet (the skeleton 26 of the blade being the geometrical line of points situated at equal distance from the pressure side and suction side faces 22 and 24 of the blade).

The variations in this skeleton angle along the chord D of the blade from a curve referred to as the skeleton curve.

Figure 3:
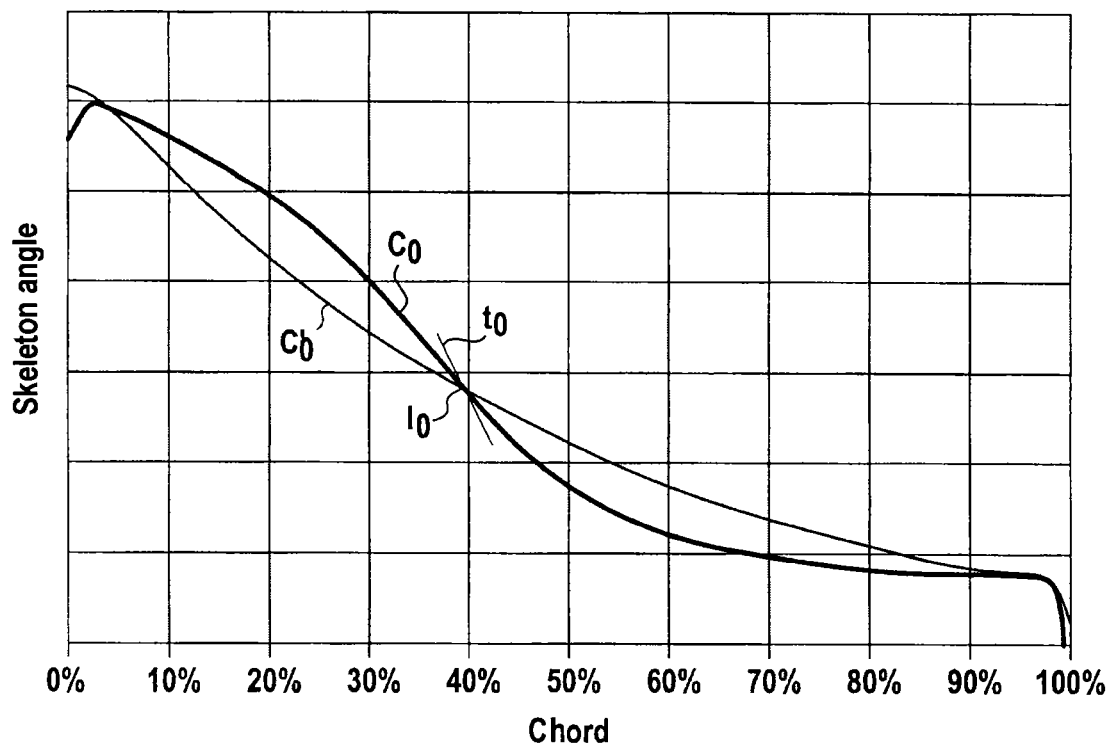
FIG. 3 shows an example of a skeleton curve for airfoil sections of a blade in accordance with the invention.

Thus, FIG. 3 shows a skeleton curve $C_0$ for the root section (i.e. the airfoil section situated at 0% of the total radial height of the airfoil) for a blade in accordance with the invention as a function of a percentage of the chord of the blade (0% of the chord corresponding to the leading edge and 100% corresponding to its trailing edge). By way of comparison, FIG. 3 also shows a skeleton curve $C'_0$ for the root section of a prior art blade (i.e. in which the profiles of the root sections are not cambered).

In FIG. 3, it can be seen that the skeleton curve $C_0$ does indeed present a point of inflection $I_0$ (i.e. a point where the tangent $t_0$ to the curve crosses the curve). By way of comparison, the skeleton curve $C'_0$ for the root section of a prior art blade does not present any point of inflection.

Advantageously, the points of inflection I for all of the skeleton curves of the airfoil sections situated between the root section $S_{root}$ and the airfoil section $S_{30}$, and in particular the point of inflection $I_0$ are located in the range 25% to 75% of the chord length of the blade measured from the leading edge and going towards the trailing edge.

These points of inflection are preferably located in the range 40% to 50% along the length of the chord of the blade. Thus, in FIG. 3, the point of inflection $I_0$ for the root section is situated at about 40% of the length of the chord.

Furthermore, in another advantageous disposition, the slope of the tangent at the point of inflection of the skeleton curve decreases continuously from the root section $S_{root}$ to the airfoil section $S_{30}$ situated at 30% of the total radial height of the airfoil.

This reduction in the slope of the tangent at the point of inflection of the skeleton curve is continuous and uninterrupted between the root section $S_{root}$ and the airfoil section $S_{30}$. Beyond the airfoil section $S_{30}$, the skeleton curves of the airfoil sections return to a conventional appearance, i.e. they no longer present a point of inflection in the indicated zone.

Surprisingly, the inventors have observed that the presence of a cambered profile in all of the airfoil sections situated between the root section $S_{root}$ and an airfoil section $S_{30}$ enable the frequency of the 1F mode of the blade to be increased without correspondingly degrading its aerodynamic flow.

Figure 4:
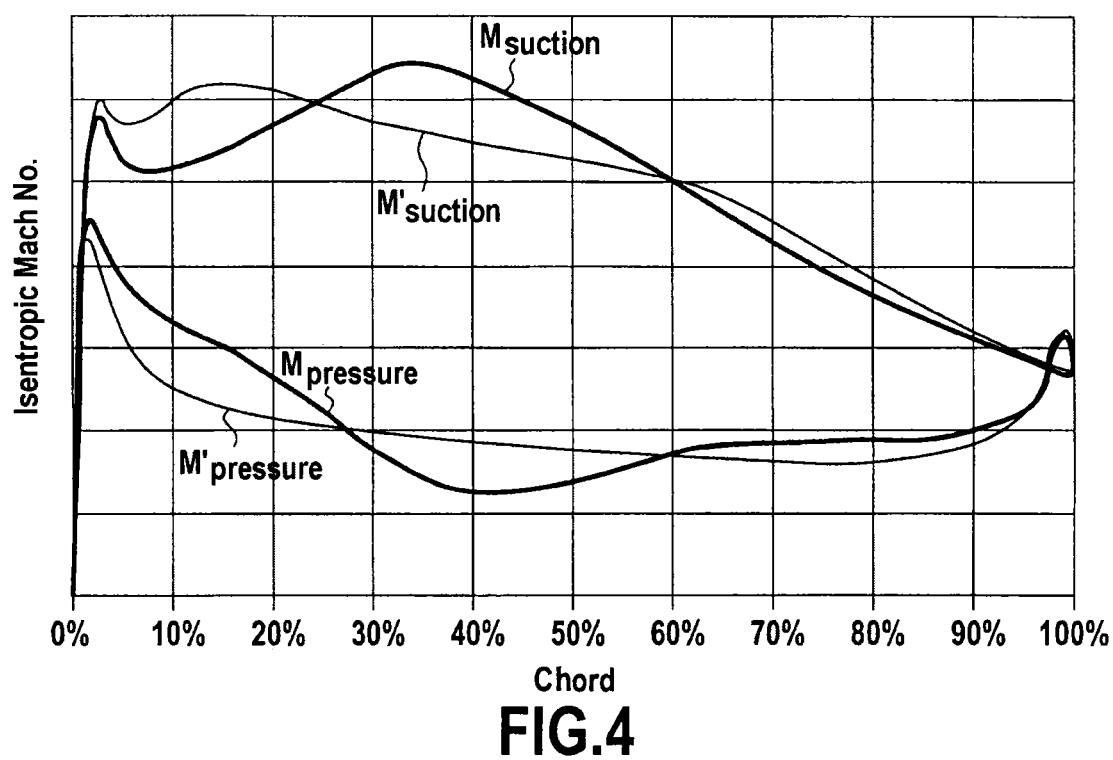
FIG. 4 shows the impacts on the aerodynamic flow of a blade profile of the invention.

FIG. 4 illustrates such an advantage. This figure plots curves representative of the pressure side and of the suction side distributions of isentropic Mach number (curves $M_{pressure}$ and $M_{suction}$) for a blade in accordance with the invention, and for a blade in accordance with the prior art (curves $M'_{pressure}$ and $M'_{suction}$).

Analyzing these curves that are representative of the aerodynamic flow of those blades shows that the suction side isentropic Mach number (curve $M_{suction}$) is acceptable. In particular, its level is equivalent to that of a prior art blade (curve $M'_{suction}$).

The invention claimed is:

1. A fan blade for an airplane turbojet, the fan blade comprising:
   an airfoil extending axially between a leading edge and a trailing edge and including a plurality of airfoil sections stacked radially between a root section and a tip section,
   wherein all of the airfoil sections situated between the root section and an airfoil section situated at a radial height corresponding to 30% of a total radial height of the airfoil possess a skeleton curve having a point of inflection, the skeleton curve being constituted by variations in a skeleton angle as a function of position along a chord of the airfoil, the skeleton angle being an angle formed between a tangent at each point of a blade skeleton with a longitudinal axis of the turbojet, the blade skeleton being a geometrical line of points situated at equal distance from a pressure side face and a suction side face of the airfoil, and the point of inflection being a point where a tangent to the skeleton curve crosses the skeleton curve,
   wherein the skeleton angles of the skeleton curve of the root section decrease from 10% to 90% of a chord length of the blade as measured from the leading edge going towards the trailing edge, and
   wherein an entirety of a suction side face of the airfoil is convex and an entirety of a pressure side face of the airfoil is concave.

2. The fan blade according to claim 1, wherein the points of inflection of the skeleton curves of airfoil sections lying between the root section and the airfoil section situated at a radial height corresponding to 30% of the total radial height of the airfoil are situated in a range 25% to 75% of the chord length of the blade as measured from the leading edge going towards the trailing edge.

3. The fan blade according to claim 2, wherein the points of inflection of the skeleton curves of airfoil sections lying between the root section and the airfoil section situated at a radial height corresponding to 30% of the total radial height of the airfoil are situated in a range 40% to 50% of the chord length of the blade as measured from the leading edge going towards the trailing edge.

4. The fan blade according to claim 3, wherein the point of inflection of the skeleton curve of the airfoil section lying at the root section is situated at 40% of the chord length of the blade as measured from the leading edge going towards the trailing edge.

5. The fan blade according to claim 1, wherein a slope of the tangent at the point of inflection of the skeleton curve decreases continuously between the root section and the airfoil section situated at a radial height corresponding to 30% of the total radial height of the airfoil.

6. The fan blade according to claim 1, wherein the airfoil is made of metal.

7. An airplane turbojet fan comprising a plurality of fan blades according to claim 1.

8. An airplane turbojet comprising a fan according to claim 7.

9. The fan blade according to claim 1, wherein a suction side isentropic Mach number of the blade is at maximum between 30% and 40% of the chord length of the blade as measured from the leading edge going towards the trailing edge, and a pressure side isentropic Mach number of the blade is at a minimum between 30% and 50% of the chord length of the blade as measured from the leading edge going towards the trailing edge.

10. The fan blade according to claim 1, wherein a skeleton curve of all of the airfoil sections situated between the airfoil section situated at a radial height corresponding to 30% of a total radial height of the airfoil and the tip section are free of an inflection point where a tangent to the skeleton curve crosses the skeleton curve.

* * * * *